April 2, 1935.  P. M. BOURDON  1,996,140
MOUNTING OF TWIN TIRED WHEELS
Filed Feb. 25, 1933  6 Sheets-Sheet 1
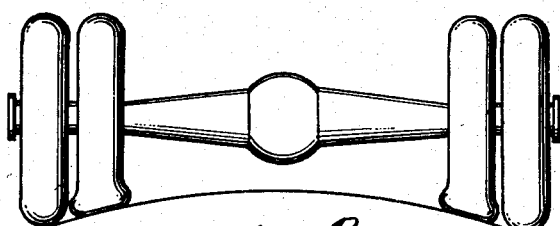
Fig. 1.
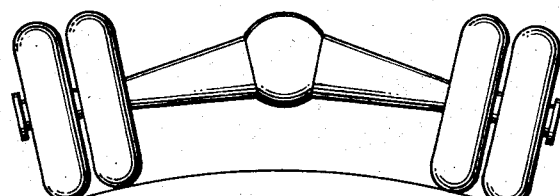
Fig. 2.
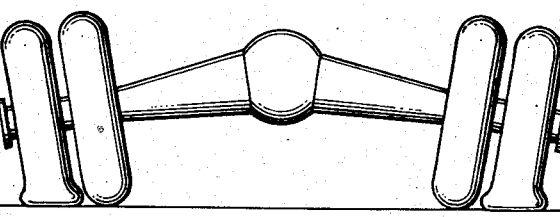
Fig. 2ª.
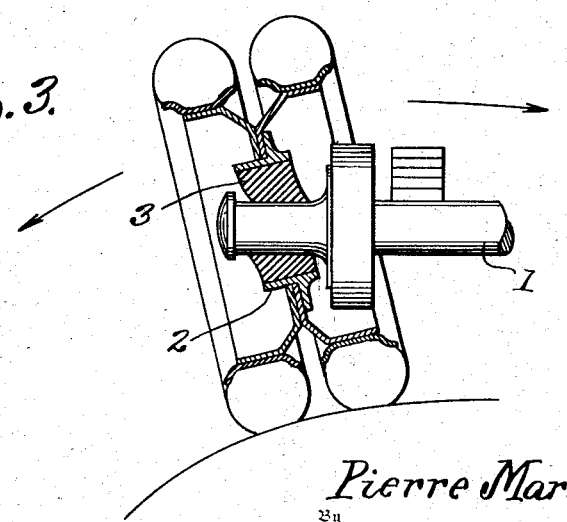
Fig. 3.
Inventor
Pierre Marcel Bourdon
By Wilkinson & Mawhinney
Attorneys.

April 2, 1935. P. M. BOURDON 1,996,140
MOUNTING OF TWIN TIRED WHEELS
Filed Feb. 25, 1933 6 Sheets-Sheet 3

Inventor
Pierre Marcel Bourdon
By Wilkinson & Mawhinney
Attorneys.

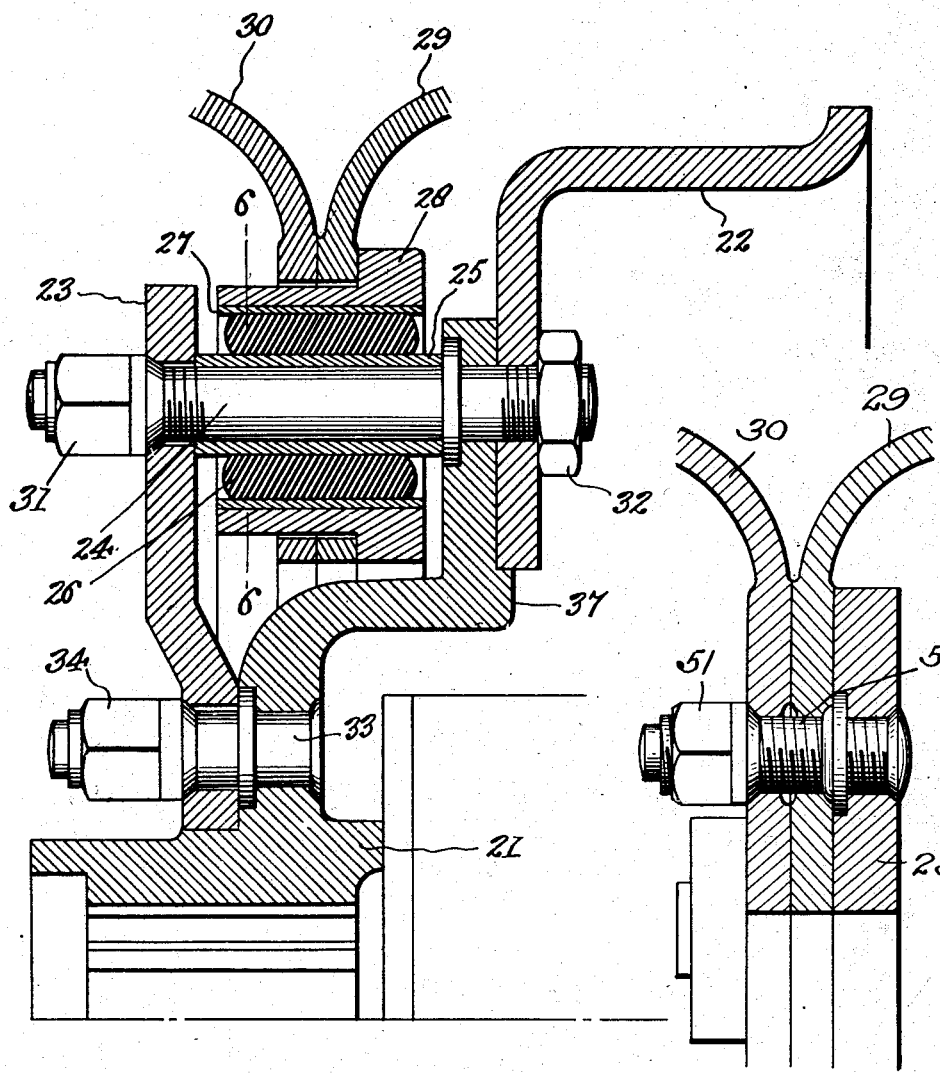

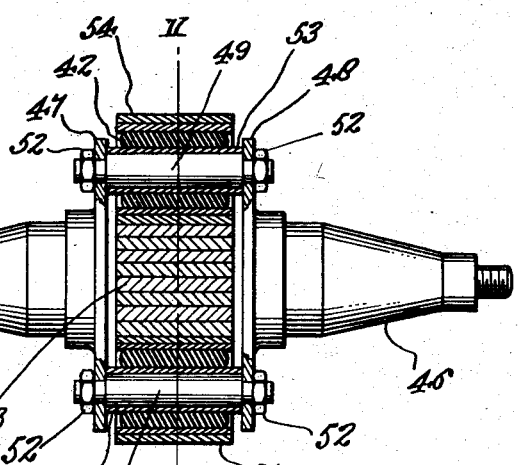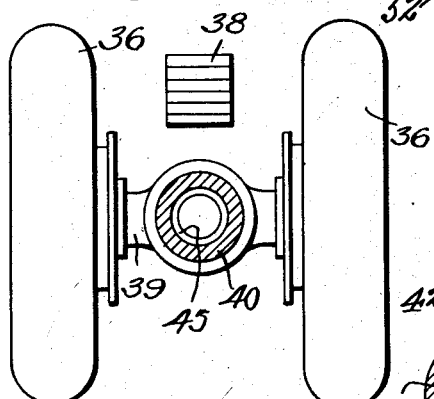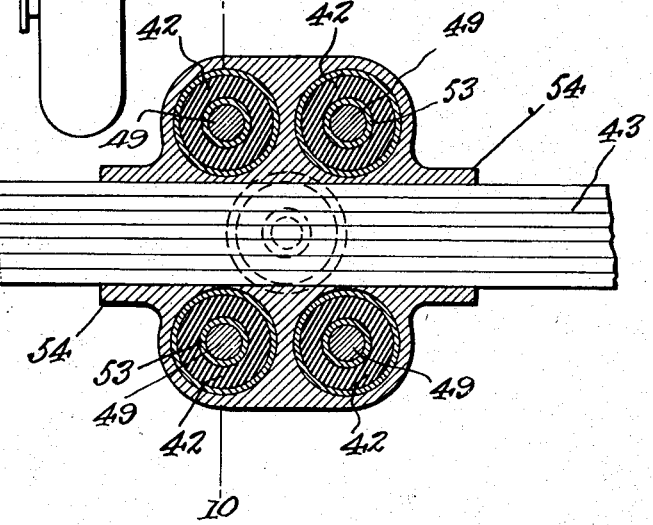

Patented Apr. 2, 1935

1,996,140

UNITED STATES PATENT OFFICE 1,996,140

MOUNTING OF TWIN TIRED WHEELS

Pierre Marcel Bourdon, Paris, France, assignor to Michelin et Cie, Clermont-Ferrand, France, a corporation of France Application February 25, 1933, Serial No. 658,627
In France March 22, 1932

9 Claims. (Cl. 152—43)

The present invention relates to improvements in the mounting of twin tired wheels, and has for an object to provide a yieldable mounting whereby the two tires may conform to the road and equally bear the load.

The invention further aims to balance the weight supported by the two tires in a manner to make uniform the wear of the tires, particularly pneumatic tires.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a diagrammatic view showing the old construction and the difficulties therewith.

Figure 2 is also a diagrammatic view showing one former proposed rearrangement to solve the problem.

Figure 2a is a further diagrammatic view showing an over-loaded condition of the tires.

Figure 3 is a vertical section of a wheel constructed according to the present invention and shown in connection with fragmentary parts of an axle and spring.

Figure 7 is a transverse section taken on the line 7—7 in Figure 6.

Figure 8 is a similar section taken on the line 8—8 also in Figure 6.

Figure 9 is an end elevation showing twin tires with a longitudinal axle and spring.

Figure 10 is a vertical section taken on the line 10—10 in Figure 11.

Figure 11 is a section taken on the line 11—11 in Figure 10.

Referring more particularly to the drawings, and for the present to Figure 1 this figure shows the usual construction of rear axle equipped with twin tires. The inner tires are clearly overloaded. This overload is due to the camber, crown or curvature of the road. It is readily seen that such an overload provokes premature wearing of the inner tires. A mounting having the same angle as the road has been proposed. An example of such mounting is shown in Figure 2. This mounting consists in arranging the two half axles in such manner that they unite at a predetermined angle which is such as to bring both inner and outer tires simultaneously upon the curved road surface to equally bear the load. This arrangement may be obtained quite easily on axles simply bearing the load but is very costly on axles having a motor drive connection, because it brings many serious mechanical complications.

Moreover this arrangement of building the axle with a certain positive camber to take care of the curvature of the road does not solve satisfactorily the problem of equalizing the load between the inner and outer tire, because the angle chosen for the camber is set and proper only for a given curvature of the road. Such angle is not correct for any other curvature; furthermore, it becomes dangerous when the road is perfectly flat because in this instance, the outer tires are overloaded as it is clearly shown in Figure 2a.

The present invention has for an object an arrangement that avoids the above inconveniences and permits a uniform apportionment of the weight on the two tires without encountering mechanical complications.

According to the invention, the arrangement permits the ensemble of the wheel to oscillate freely under the influence of the reactions resulting from the curvature of the road or pavement and from the difference in the outside diameter between the inner and outer tire which is caused by various reasons, for instance, the difference in wear or in pressure of these tires. Due to this arrangement the wheels travel normally even on a crowded road and the overload created on any of the tires is in each instance balanced by the reaction produced by the improved arrangement. Thus there is obtained a balancing of the load between the supporting tires on every character of road.

The invention consists in mounting the wheel with one or more blocks or collars of elastic material, such as caoutchouc or rubber, of any form, the blocks or collars forming elastic connections between the wheel and the hub.

The invention may be carried out in different ways, some of which are shown in the accompanying drawings.

In Figure 3, the mounting is accomplished by a single ring or collar of rubber or caoutchouc 3, mounted on the outer portion of the axle 1, this ring being fixed at its outer circumference by a collar 2 carrying, in any suitable manner, the two rims of the wheel.

Figure 4:
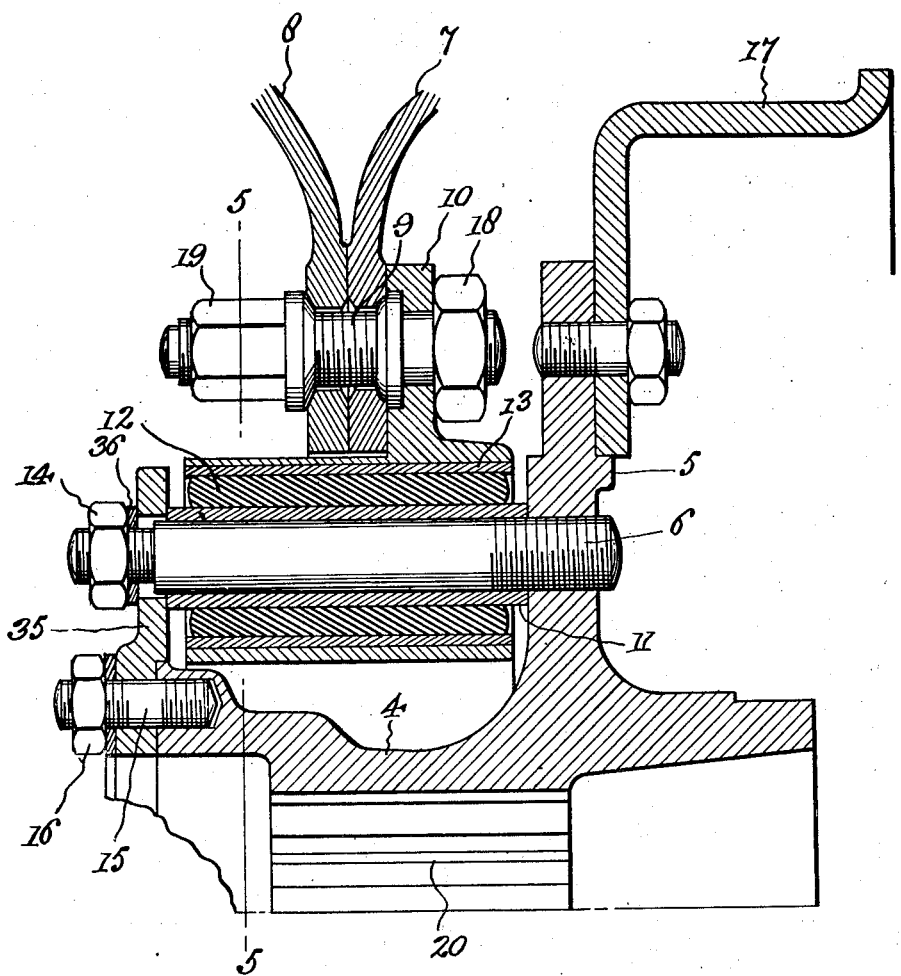
Figure 4 is a fragmentary section taken on an enlarged scale on the line 4—4 in Figure 5 of a wheel and hub construction showing a modified form of the invention.
Figure 5:
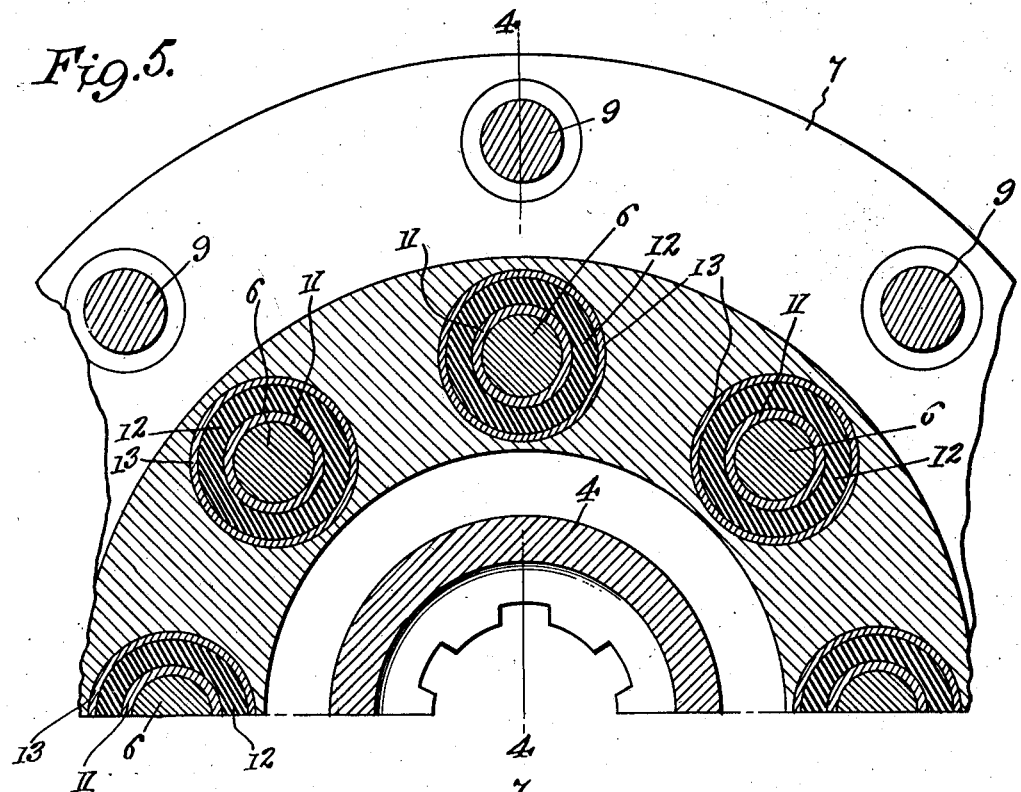
Figure 5 is a section taken on the line 5—5 in Figure 4.

Figures 4 and 5 show another mode of construction in which the wheel is secured to the hub by several collars of caoutchouc arranged around the circumference having as its center the axis of the hub. The hub is indicated at 4 and the two discs carrying the two rims having the twin tires at 7 and 8. These members or discs 7 and 8 are fixed to an annular member 10 in any suitable manner, for example, by the bolts 9 having the nuts 18 and 19. The annular member 10 is carried by the hub with the aid of elastic parts 12. The elastic parts may be made of a desired number of elastic sleeves or paddings, arranged around in a circumference having as its center the axis of the axle. These sleeves or pad members 12 are mounted on the spindles or bolts 6. These bolts 6 are disposed between the hub flange 5 and the removable plates 35. Screws or other fastenings 15 also assist to hold the plate 35 to the hub 4, such fastenings 15 having nuts 16 and washers thereon. The bolts 6 carry nuts 14 with washers 36 interposed between the nuts 14 and the outer plate 35.

The rubber sleeves 12 are placed between two concentric metallic sleeves 11 and 13 and may be attached to them in any suitable manner as desired.

At 17 is shown the brake drum secured to the hub flange 5; and at 20 the spline grooves for connecting the hub with the splines of the axle.

Figure 6:
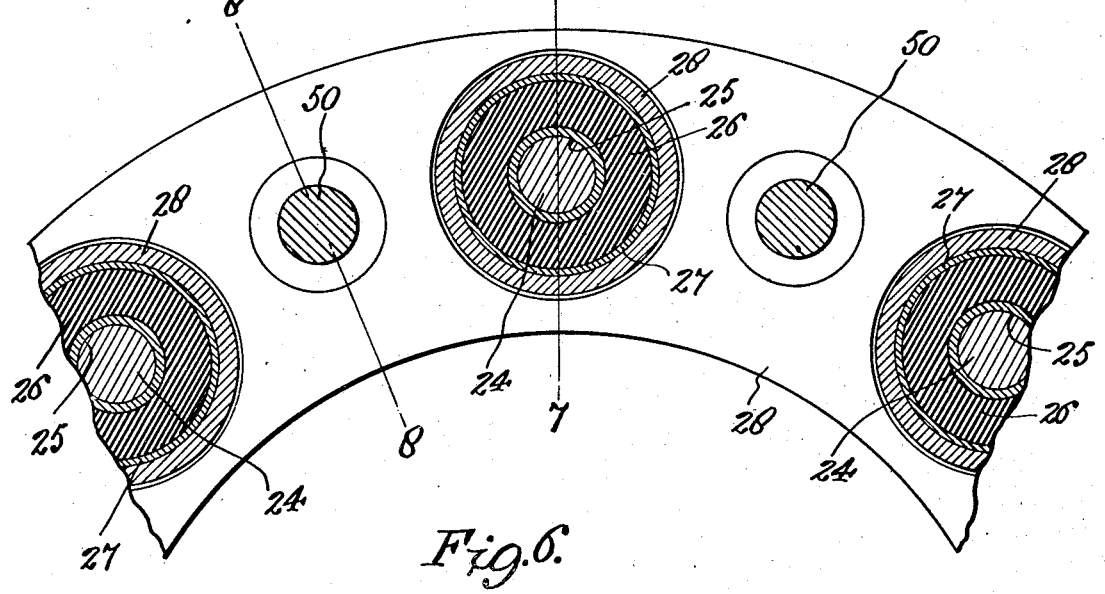
Figure 6 is a vertical section taken on the line 6—6 in Figure 7 and showing a further modification.

Referring more particularly to Figures 6, 7 and 8, a further modification is shown applied to a usual form of twin-tired wheel adaptable for existing forms of hubs. In this construction rubber or other blocks are inserted between the attaching bolts of the wheel and the wheel itself.

In these figures are shown two wheel discs 29 and 30 attached to one another, as shown in Figure 8, by the pins or bolts 50 and the nuts 51. These bolts 50 are disposed around the wheel in a circle at spaced intervals. Between these bolts are arranged other bolts or spindles 24 connecting the assembly of the wheel parts 29 and 30 to the hub 21 with interposed elastic sleeves 26.

Referring more particularly to Figure 7, the hub 21 carries the hub flange 37, to which is attached the brake drum 22. To the flange 37 is also coupled a detachable plate 23, for example by bolts 33 and nuts 34. The twin wheels 29 and 30 are secured to the hub through the rubber sleeves 26, each such rubber sleeve being inserted within a metallic sleeve 28 which is affixed by the bolts 50 to the wheel parts 29 and 31. Between each rubber sleeve 26 and metallic sleeve 28 is interposed a packing sleeve 27; and between the rubber sleeves 26 and the bolts 24, metallic packing sleeves 25 are inserted. The bolts 24 are provided with nuts 31 and 32.

Referring more particularly to Figure 9, this figure shows a construction involving twin wheels and being particularly applicable to heavy vehicles. Two corresponding wheels 36 are shown as connected by an axle 39. This axle instead of being mounted by a mechanical device especially designed to permit of transverse pivoting is simply mounted, through one or more rubber or other flexible collars 40, upon a longitudinal axle 45, which supports the spring 38.

Figures 10 and 11 show two views at right angles to one another. In this case the axle is constructed in two halves 41 and 46 arranged on opposite sides of a spring 43 and provided with flanges 47 and 48 which may be in one piece with the half axles. Such flanges are connected by bolts 49 having sleeves 53 the ends of which form abutments against which the flanges 47 and 48 are forced by the nuts 52 threaded on the bolts 49. The bolts 49 extend through openings of large diameter in a member or block 54 which is attached to the spring 43 in any suitable manner, as by sliding over the spring. Between the bolts and the walls of the openings are placed elastic sleeves 42, which permit the axle assembly and the wheels to incline transversely with respect to the spring 43 in a manner whereby the treads of the wheels will adapt themselves to the contour of the road.

Figure 12:
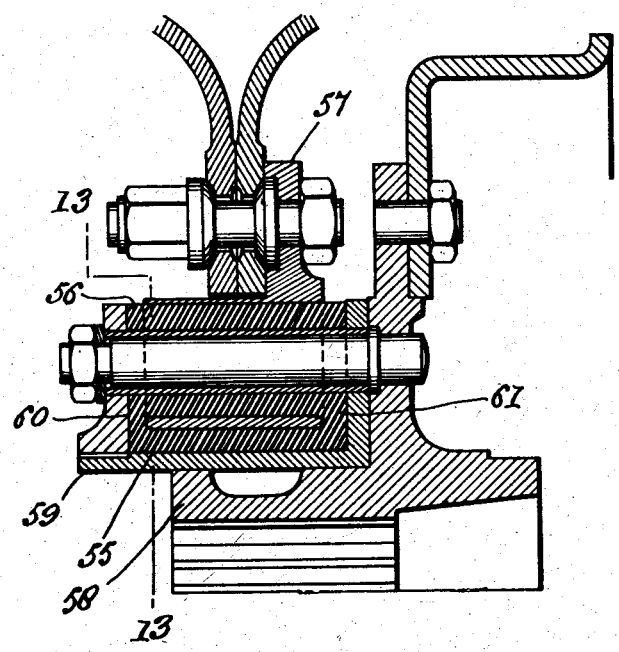
Figure 12 is a fragmentary vertical section showing a further modification.
Figure 13:
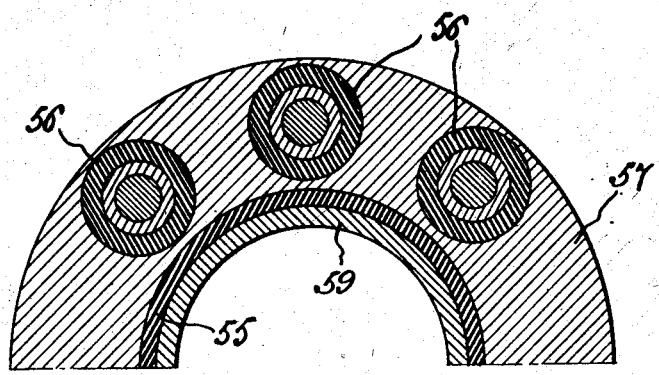
Figure 13 is a vertical section taken on the line 13—13 in Figure 12.

Figures 12 and 13 show another modification in which the wheel is mounted on the hub 58 by means of an annular elastic sleeve 55 and also by the use of a series of elastic sleeves 56. According to this arrangement the wheels are mounted on an annular member 57 connected flexibly to the hub member 59 by means of a molded caoutchouc or other packing which constitutes an ensemble formed by the tubular parts 56 on the one hand and the sleeve 55 on the other; said parts being connected to one another by the vertical parts or webs 60 and 61. This ensemble or assembly constitutes an elastic connection permitting the oscillation or movement of the wheels according to the reaction of the ground whereby both wheels will uniformly share the support of the load and the transmission of power including tractive effort.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination with a hub having a hub flange, a plate removably carried by the hub outwardly of the hub flange, bolts extending between said hub flange and plate, resilient bodies extending about said bolts and having their ends spaced from the hub flange and plate, and a wheel body carrying twin tires supported about said resilient bodies in spaced relation to said flange and plate.

2. In combination with a hub having a hub flange, a removable plate secured to the hub, bolts extending from the hub flange to the plate, rubber rings extending about the bolts and having the opposite ends thereof spaced from the hub flange and plate, an annular member having sleeves extending about said rubber rings in spaced relation to the flange and plate, and a wheel having twin tires secured to said annular member.

3. In combination with a hub, a wheel body having twin tires and movable angularly relative to the hub, and a body of caoutchouc interposed between said wheel body and hub for interconnecting the body and hub in spaced apart relation and permitting transverse flexibility of the wheel body relative to the axis of the hub.

4. In combination with a hub having a hub flange, an outer removable plate secured to the hub, bolts extending between said plate and hub flange, metallic sleeves about said bolts, padding sleeves extending in spaced relation about the first mentioned sleeves, rubber rings lying between said sleeves and spaced from said plate and hub flange, an annular member fitted about said padding sleeves, and a wheel body having twin tires secured to said annular member, said annular member and all of said padding sleeves being spaced from said hub flange and plate to admit canting of the wheel body and equalization of the load upon the twin tires.

5. In combination with a hub having a hub flange, an outer plate spaced from the hub flange, bolts extending between said plate and hub flange in a concentric circle about the axis of the wheel and in spaced circumferential relation, a wheel body carrying a plurality of tires, an annular member having openings for receiving said bolts, resilient bodies extending between the bolts and said annular member, said annular member and resilient bodies being spaced at opposite ends from the hub flange and plate to admit a limited canting of the wheel body and annular member on the hub, and fastening means for securing the wheel body to said annular member, said fastening means lying between said bolts.

6. In a load equalizing twin tire wheel, a hub having axially spaced abutments thereabout, a twin tire rim disposed in spaced relation to the abutments about the hub and having a central web part projecting toward the hub between and spaced from the abutments and the hub, and elastic connections disposed between and spaced from the abutments and engaging the web to support the latter and its rim on the hub, said web adapted to engage the abutments upon the undue canting of the rim and transmit the load between the web and the abutments, said elastic connections adapted to yield under pressure of canting the rim and its web when the load is unequally placed on the twin tires to admit equalization of the load within the limits of said abutments.

7. In a twin tire wheel, a wheel body, a pair of twin tires mounted on the wheel body, a hub member movable angularly relative to the wheel body, a concentric row of independently yieldable connecting and supporting devices between the hub member and the wheel body to resist canting of the latter relative to the axis of the hub member, and abutment means on the hub member to restrict the angular movement of the wheel body.

8. In combination, a hub, a pair of spaced apart rims, a web for said rims and extending inwardly toward said hub at a point midway between the rims, bolts carried by said hub and extending transversely of said web, and resilient bodies about the bolts for connecting the web to the hub in a manner to permit limited canting of the web relative to the hub.

9. In combination, a hub, a pair of spaced apart rims, a web for said rims extending inwardly toward said hub at a point midway between the rims, means for loosely mounting the web on the hub for limited angular movement relative to the hub, and yieldable means engaging the web and the mounting means to yieldably resist angular movement of the web relative to the hub.

PIERRE MARCEL BOURDON.